US011229073B2

(12) United States Patent
Yang

(10) Patent No.: US 11,229,073 B2
(45) Date of Patent: Jan. 18, 2022

(54) NETWORK CONNECTION CONFIGURATION METHOD AND RELATED PRODUCT

(71) Applicant: Guangdong OPPO Mobile Telecommunications Corp., Ltd., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 76 days.

(21) Appl. No.: 16/605,328

(22) PCT Filed: Apr. 28, 2017

(86) PCT No.: PCT/CN2017/082456
§ 371 (c)(1),
(2) Date: Oct. 15, 2019

(87) PCT Pub. No.: WO2018/195924
PCT Pub. Date: Nov. 1, 2018

(65) Prior Publication Data
US 2021/0144783 A1  May 13, 2021

(51) Int. Cl.
*H04W 76/14* (2018.01)
*H04W 76/10* (2018.01)
(Continued)

(52) U.S. Cl.
CPC .......... *H04W 76/14* (2018.02); *H04W 8/005* (2013.01); *H04W 76/25* (2018.02); *H04W 76/27* (2018.02); *H04W 92/18* (2013.01)

(58) Field of Classification Search
CPC ..... H04W 76/14; H04W 76/25; H04W 76/27; H04W 8/005; H04W 92/18
See application file for complete search history.

(56) References Cited

U.S. PATENT DOCUMENTS

2016/0212682 A1\* 7/2016 Chung ................ H04W 12/06
2016/0269185 A1\* 9/2016 Stojanovski .......... H04L 9/0844
(Continued)

FOREIGN PATENT DOCUMENTS

CN    106162929 A    11/2016
CN    106535083 A    3/2017
(Continued)

OTHER PUBLICATIONS

3GPP TSG RAN Meeting #72; RP-161303; Busan, Korea, Jun. 13-16, 2016 Source: Qualcomm Incorporated, Intel, Huawei, HiSilicon, LG Electronics Inc.; Title: Revision of SI: Further Enhancements LTE Device to Device, UE to Network Relays for IoT and Wearables Document for: Approval; Agenda Item: 10.6.12.
(Continued)

*Primary Examiner* — Farid Seyedvosoghi
(74) *Attorney, Agent, or Firm* — Young Basile Hanlon & MacFarlane, P.C.

(57) ABSTRACT

A network connection configuration method and related products are provided. The method includes: a first user equipment sends a first message to a network device when the first user equipment determines that a network connection needs to be established or modified; wherein the first message is used for applying for establishing or modifying the network connection, a connection type of the network connection includes a Signaling Radio Bearer (SRB) and/or a Data Radio Bearer (DRB), and the first message is further used for indicating that a device served by the network connection applied for by the first user equipment is at least one user equipment except the first user equipment.

18 Claims, 7 Drawing Sheets

(51) Int. Cl.
*H04W 76/25* (2018.01)
*H04W 76/27* (2018.01)
*H04W 8/00* (2009.01)
*H04W 92/18* (2009.01)

(56) References Cited

U.S. PATENT DOCUMENTS

2018/0092150 A1* 3/2018 Tenny .................. H04W 4/80
2018/0279275 A1* 9/2018 Chen .................. H04W 76/14

FOREIGN PATENT DOCUMENTS

| EP | 3567981 | A1 | 11/2019 |
| KR | 20150022240 | A | 3/2015 |
| WO | 2017014716 | A1 | 1/2017 |
| WO | 2017024453 | A1 | 2/2017 |
| WO | 2017034511 | A1 | 3/2017 |

OTHER PUBLICATIONS

3GPP TSG-RAN WG2 #91; R2-153241; Beijing, China, Aug. 24-28, 2015.
Extended EP Search Report for EP 17907646.8 dated Mar. 3, 2020.
Japan Office Action with English Translation for JP Application 2019-556334 dated Mar. 22, 2021. (8 pages).
European Examination Report for EP Application 17907646.8 dated Feb. 10, 2021. (6 pages).
India First Examination Report for IN Application 201917044725 dated Jan. 29, 2021. (5 pages).
ZTE, Discussion on connection establishment and bearer setup, 3GPP TSG-RAN WG2 Meeting #96, R2-168149, Nov. 14-18, 2016. (4 pages).
Nokia, Bearer modelling and E2E QoS support for layer-2 relaying, 3GPP TSG-RAN WG2 Meeting#97bis, R2-1703363, Apr. 3-7, 2017. (5 pages).
Huawei, HiSilicon, Feasibility of Bluetooth for UE relay, 3GPP TSG RAN WG2 Meeting #95, R2-165465, Aug. 22-26, 2016. (3 pages).
ZTE, Bearer Configuration at Relay UE in feD2D, 3GPP TSG-RAN WG2 Meeting #97, R2-1700801, Feb. 13-17, 2017. (4 pages).
Huawei, HiSilicon, RRC Connection establishment and bearer setup via L2 Relay, 3GPP TSG-RAN WG2 #97bis, R2-1703466, Apr. 3-7, 2017. (6 pages).
Korean Office Action with English Translation for KR Application 10-2019-7032584 dated Apr. 29, 2021. (14 pages).
Japanese Decision of Refusal with English Translation for JP Application 2019556334 dated Sep. 7, 2021. (6 pages).
Korean Notification of Reason for Refusal with English Translation for KR Application 1020197032584 dated Oct. 22, 2021. (15 pages).

* cited by examiner

NETWORK CONNECTION CONFIGURATION METHOD AND RELATED PRODUCT

CROSS-REFERENCE TO RELATED APPLICATION(S)

This application is a 371 application of International Application No. PCT/CN2017/082456, filed on Apr. 28, 2017 the entire disclosure of which is hereby incorporated by reference.

TECHNICAL FIELD

The present application relates to the field of communication technologies, and in particular, to a network connection configuration method and a related product.

BACKGROUND

A Device-to-Device (D2D) communication mode refers to a communication mode in which a sending end directly sends data to a receiving end without relaying through a base station or cellular network. A special mode in the D2D communication mode is that one User Equipment (UE) connects with a network through another user equipment with a relay functionality. Generally, the former is referred to as a remote user equipment (i.e., Remote UE), and the latter is referred to as a relay user equipment (i.e., Relay UE).

In 3rd Generation Partnership Project (3GPP) Release 13 (Rel-13), a Relay mechanism based on the Internet Protocol (IP) layer (or Layer 3) is defined, that is, a Remote UE connects and communicates with a network through a Relay UE, and the Relay UE forwards communication data between the Remote UE and the network through the IP layer.

Further enhanced Device-to-Device (FeD2D) based on the D2D technology further extends a Relay capability of an existing Rel-13 UE to the network, for example, Layer 3 Relay is changed to Layer 2 Relay (a way in which data forwarding is performed above a Radio Link Control (RLC) layer and below a Packet Data Convergence Protocol (PDCP) layer of the Relay UE may be referred to as Layer 2 Relay). Meanwhile, a traditional Radio Resource Control (RRC) connection directly connected via a Uu link is further extended to be a RRC connection supporting a relay via PC5. To satisfy the change from Layer 3 Relay to Layer 2 Relay, the traditional RRC connection needs to be further enhanced.

For the Relay UE and Remote UE, connection types of network connections required by them are independent of each other. There may be following connection types: 1) no connection demand (i.e. RRC idle state); 2) only a Signaling Radio Bearer (SRB) connection demand; 3) connection demands for SRB and Data Radio Bearer (DRB). When a current network state of the Relay UE cannot satisfy the Remote UE, the Relay UE needs to establish a network connection for the Remote UE, or needs to modify the network connection for the Remote UE. Therefore, how the Relay UE establishes or modifies the network connection for the Remote UE is a technical problem to be solved.

SUMMARY

Implementations of the present application provide a network connection configuration method and related products, which are used for a Relay User Equipment (UE) to establish or modify a network connection for a Remote UE.

In a first aspect, an implementation of the present application provides a network connection configuration method, which includes: a first User Equipment (UE) sends a first message to a network device when the first user equipment determines that a network connection needs to be established or modified; wherein, the first message is used for applying for establishing or modifying a network connection, a connection type of the network connection includes a Signaling Radio Bearer (SRB) and/or a Data Radio Bearer (DRB), and the first message is further used for indicating that a device served by the network connection applied for by the first user equipment is at least one user equipment except the first user equipment.

In a second aspect, an implementation of the present application provides a network connection configuration method, which includes: a network device receives a first message sent by a first user equipment when the first user equipment determines that a network connection needs to be established or modified, wherein the first message is used for applying for establishing or modifying a network connection, a connection type of the network connection includes a Signaling Radio Bearer (SRB) and/or a Data Radio Bearer (DRB), and the first message is further used for indicating that a device served by the network connection applied for by the first user equipment is at least one user equipment except the first user equipment; and the network device determines whether to accept the network connection applied for by the first user equipment according to the first message.

In a third aspect, an implementation of the present application provides a network connection configuration method, which includes: a second user equipment sends a second message to a first user equipment; wherein, the second message is used for indicating a connection type of a network connection that the second user equipment needs to establish, and the second message is further used for the first user equipment to determine whether establishing or modifying a network connection is needed.

In a fourth aspect, an implementation of the present application provides a user equipment applied in a communication system, wherein the communication system includes a first user equipment, a second user equipment and a network device, and the user equipment is the first user equipment including a processing unit and a communication unit.

The processing unit is used for sending a first message to the network device through the communication unit when the first user equipment determines that a network connection needs to be established or modified.

The first message is used for applying for establishing or modifying a network connection, a connection type of the network connection includes a Signaling Radio Bearer (SRB) and/or a Data Radio Bearer (DRB), and the first message is further used for indicating that a device served by the network connection applied for by the first user equipment is at least one user equipment except the first user equipment.

In a fifth aspect, an implementation of the present application provides a network device including a processing unit and a communication unit.

The processing unit is used for receiving, through the communication unit, a first message sent by a first user equipment when the first user equipment determines that a network connection needs to be established or modified, wherein the first message is used for applying for establishing or modifying a network connection, a connection type of the network connection includes a Signaling Radio Bearer (SRB) and/or a Data Radio Bearer (DRB), and the first message is further used for indicating that a device served by the network connection applied for by the first user equipment is at least one user equipment except the first user equipment.

The processing unit is further used for determining whether to accept the network connection applied for by the first user equipment according to the first message.

In a sixth aspect, an implementation of the present application provides a user equipment applied in a communication system, wherein the communication system includes a first user equipment, a second user equipment and a network device, and the user equipment is the second user equipment including a processing unit and a communication unit.

The processing unit is used for sending a second message to the first user equipment through the communication unit.

The second message is used for indicating a connection type of a network connection that the second user equipment needs to establish, and the second message is further used for the first user equipment to determine whether establishing or modifying a network connection is needed.

In a seventh aspect, an implementation of the present application provides a user equipment including one or more processors, one or more storages, one or more transceivers, and one or more programs. The one or more programs are stored in the one or more storages and configured to be executed by the one or more processors. The one or more programs include instructions for executing acts in the method as described in the first aspect.

In an eighth aspect, an implementation of the present application provides a network device including one or more processors, one or more storages, one or more transceivers, and one or more programs. The one or more programs are stored in the one or more storages and configured to be executed by the one or more processors. The one or more programs include instructions for executing acts in the method as described in the second aspect.

In a ninth aspect, an implementation of the present application provides a user equipment including one or more processors, one or more storages, one or more transceivers, and one or more programs. The one or more programs are stored in the one or more storages and configured to be executed by the one or more processors. The one or more programs include instructions for executing acts in the method as described in the third aspect.

In a tenth aspect, an implementation of the present application provides a computer readable storage medium storing a computer program for electronic data interchange. The computer program causes a computer to execute the method of the first aspect.

In an eleventh aspect, an implementation of the present application provides a computer readable storage medium storing a computer program for electronic data interchange. The computer program causes a computer to execute the method of the second aspect.

In a twelfth aspect, an implementation of the present application provides a computer readable storage medium storing a computer program for electronic data interchange. The computer program causes a computer to execute parts or all of the acts described in the method of the third aspect.

In a thirteenth aspect, an implementation of the present application provides a computer program product. The computer program includes a non-transitory computer readable storage medium storing a computer program, and the computer program is operable to cause a computer to execute the method of the first aspect.

In a fourteenth aspect, an implementation of the present application provides a computer program product. The computer program includes a non-transitory computer readable storage medium storing a computer program, and the computer program is operable to cause a computer to execute the method of the second aspect.

In a fifteenth aspect, an implementation of the present application provides a computer program product. The computer program includes a non-transitory computer readable storage medium storing a computer program, and the computer program is operable to cause a computer to execute the method of the third aspect.

These aspects and other aspects of the present application will be more simply understood in following description of the implementations.

BRIEF DESCRIPTION OF DRAWINGS

To describe the technical solutions in implementations of the present application or the existing technology more clearly, accompanying drawings that need to be used in the description of implementations or the prior art will be briefly introduced below. It is apparent that the accompanying drawings described below are only some implementations of the present application; and for a person of ordinary skill in the art, other drawings may be obtained according to these drawings without paying an inventive effort.

DETAILED DESCRIPTION

To better understand solutions of the present application for one skilled person in the art, technical solutions in implementations of the present application will be described clearly and completely below with reference to the drawings in the implementations of the present application. It is apparent that the described implementations are only a part, but not all, of the implementations of the present application. According to the implementations of the present application, all other implementations achieved by a person of ordinary skill in the art without paying an inventive effort should fall within the protection scope of the present application.

Details are given below separately.

The terms "first", "second", "third" and "fourth", or the like in the description, claims and drawings of the present application are used to distinguish different objects and not used to describe a specific order. In addition, term "include" and "have" and any variations thereof are intended to cover non-exclusive inclusion. For example, a process, method, system, product, or device that includes a series of acts or units is not limited to the listed acts or units, but optionally also includes acts or units that are not listed, or optionally also includes other acts or units that are inherent to the process, method, product, or device.

The "implementation" mentioned in the application means that a particular feature, structure, or characteristic described in combination with the implementation may be included in at least one implementation of the present application. The appearance of the phrase in various places in the specification does not necessarily refer to the same implementation, nor is it an independent or alternative implementation mutually exclusive with other implementations. It is explicitly and implicitly understood by one skilled person in the art that implementations described in this disclosure may be combined with other implementations.

Implementations of the present application will be described below with reference to the accompanying drawings.

Figure 1:
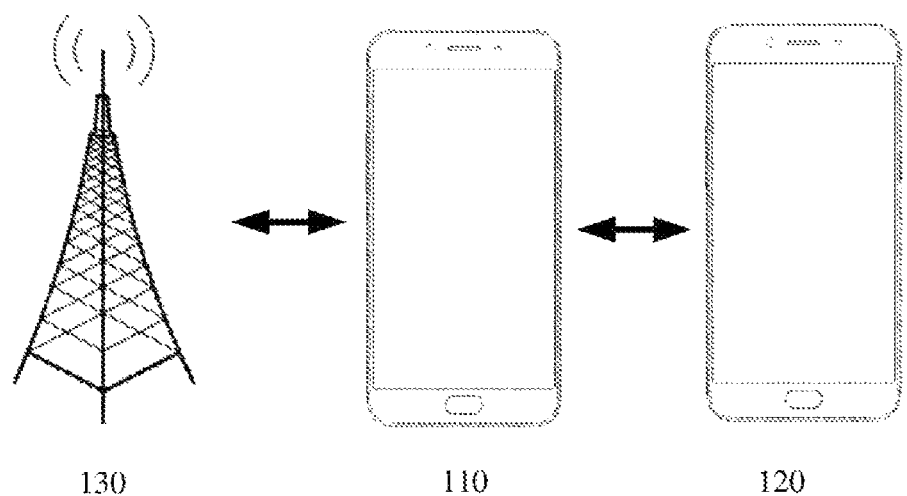
FIG. 1 is a schematic diagram of architecture of a network provided by an implementation of the present application.

Referring to FIG. 1, FIG. 1 is a schematic diagram of architecture of a network disclosed in an implementation of the present application. The architecture of the network architecture shown in FIG. 1 includes a first user equipment 110, a second user equipment 120, and a network device 130. The first user equipment 110 is a Relay UE, and the second user equipment 120 is a Remote UE. Not only a device-to-device communication mechanism based on a 3GPP Sidelink/PC5 technology may be adopted for communication between the first user equipment 110 and the second user equipment 120, but also a communication mechanism based on the non-3GPP technology may be adopted for communication between the first user equipment 110 and the second user equipment 120, such as a WLAN mechanism and a Bluetooth mechanism.

Herein, the User Equipment (UE) is a device that provides voice and/or data connectivity to users, such as a handheld device, or a vehicle-mounted device with a wireless connection function. A common user equipment includes, for example, a mobile phone, a tablet computer, a notebook computer, a palm computer, a Mobile Internet Device (MID), a wearable device such as a smart watch, a smart bracelet, a pedometer.

Herein, the network device refers to a node device at a network side. For example, the network device may be a Radio Access Network (RAN) device at an access network side in a cellular network. The so-called RAN device is a device that connects the user equipment to a wireless network, including but not limited to: an Evolved Node B (eNB), a radio network controller (RNC), a Node B (NB), a Base Station Controller (BSC), a Base Transceiver Station (BTS), a Home Base Station (e.g., a Home evolved NodeB, or a Home Node B, HNB), a BaseBand Unit (BBU), a Mobility Management Entity (MME). For another example, the network device may also be a node device in a Wireless Local Area Network (WLAN), such as an access controller (AC), a gateway, or a Wireless Fidelity (WIFI) Access Point (AP).

A network connection establishment approach provided by the implementation of the present application will be described in detail below with reference to the network architecture shown in FIG. 1.

Figure 2:
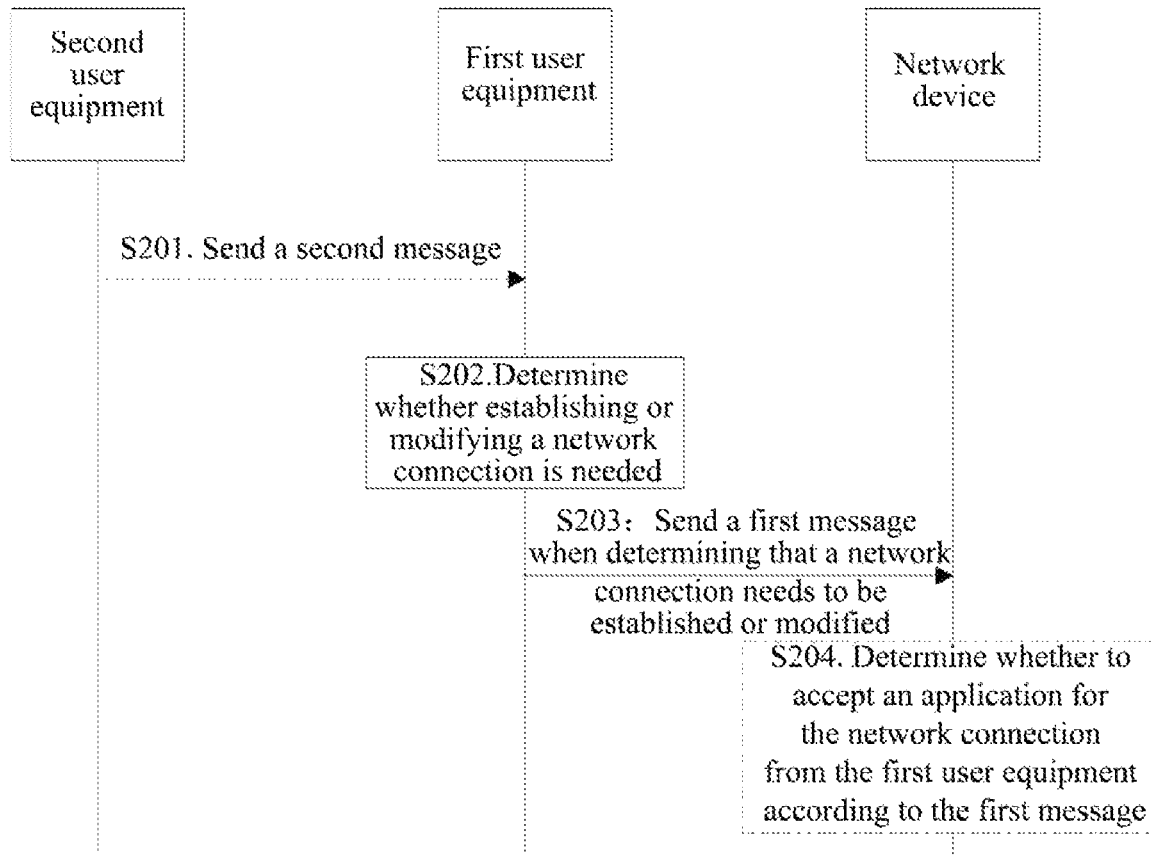
FIG. 2 is a flow chart of a network connection configuration method provided by an implementation of the present application.

Referring to FIG. 2, which is a flow chart of a network connection configuration method provided by an implementation of the application, wherein the first user equipment is a Relay UE, and the second user equipment is a Remote UE. The method includes the following acts.

In S201, a Remote UE sends a second message to a Relay UE, wherein the second message is used for indicating a connection type of a network connection that the Remote UE needs to establish, and the connection type of the network connection includes an SRB and/or a DRB.

In an example, the second message is a discovery message of device-to-device based on a Sidelink technology or PC5 interface.

In an example, the discovery message includes a message type, and a content type of the message type is used for indicating a connection type of a network connection that the Remote UE needs to establish.

Further, when the content type of the discovery message is a first preset value, it indicates that the connection type of the network connection that the Remote UE needs to establish is the SRB, and when the content type of the discovery message is a second preset value, it indicates that the connection type of the network connection that the Remote UE needs to establish is the SRB and DRB.

Figure 3:
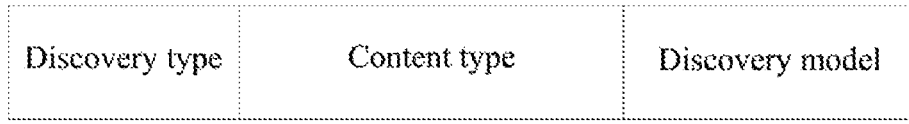
FIG. 3 is a schematic diagram a format of a message type of a Discovery message provided by an implementation of the present application.

Specifically, a format of the Message Type included in the Discovery message is shown in FIG. 3. At present, the values and corresponding meanings of the Content Type in Message Type are shown in table 1.

TABLE 1

| Content Type value | Corresponding meaning |
|---|---|
| 0000 | Announce/Response |
| 0001 | Query |
| 0010 | Application-controlled extension enabled |
| 0011 | Reserved |
| 0100 | UE-to-Network relay discovery announcement or UE-to-Network relay discovery response |
| 0101 | UE-to-Network relay discovery solicitation |
| 0110 | Group member discovery announcement or group member discovery response |
| 0111 | Group member discovery solicitation |
| 1000 | Relay discovery additional information |
| 1001 | Reserved |
| 1010 | Reserved |
| 1011 | Reserved |
| 1100 | Reserved |
| 1101 | Reserved |
| 1110 | Reserved |
| 1111 | Reserved |

For example, the Remote UE may use a reserved value (such as 0011, 1001-1111 in Table 1) in the current Content Type to indicate the connection type of the network connection that the Remote UE needs to establish. For example, if the Content Type is 1001, it indicates that the connection type of the network connection that the Remote UE needs to establish is the SRB; and if the Content Type is 1010, it indicates that the connection type of the network connection that the Remote UE needs to establish is the SRB and DRB.

In an example, the discovery message includes first indication information. The first indication information is used for indicating a connection type of a network connection that the Remote UE needs to establish.

Specifically, information of 1 bit (i.e., first indication information) may be configured (or added) in the Discovery message, and the information of 1 bit is used for indicating the connection type of the network connection that the Remote UE needs to establish. For example, when a value of the first indication information is "1", it indicates that the connection type of the network connection that the Remote UE needs to establish is the SRB. For example, when the value of the first indication information is "0", it indicates that the connection type of the network connection that the Remote UE needs to establish is the SRB and DRB.

Alternatively, Spare in the Discovery message may be used for indicating a connection type of a network connection that a Remote UE needs to establish. New information (i.e., first indication information) is defined by occupying 1 bit in the Spare, and the newly defined information is used for indicating a connection type of a network connection that a Remote UE needs to establish. For example, if the connection type of the network connection that the Remote UE needs to establish is the SRB, a value of the newly defined information bit in the Discovery message sent by the Remote UE is "1"; and if the connection type of the network connection that the Remote UE needs to establish is the SRB and DRB, the value of the newly defined information bit in the Discovery message sent by the Remote UE is "0".

In an example, the second message is a PC5 signaling, and a message type of the PC5 signaling is used for indicating a connection type of a network connection that a Remote UE needs to establish.

Further, when the message type of the PC5 signaling is a third preset value, it indicates that the connection type of the network connection that the Remote UE needs to establish is the SRB, and when the content type of the PC5 signaling is a fourth preset value, it indicates that the connection type of the network connection that the Remote UE needs to establish is the SRB and DRB.

Specifically, the PC5 signaling is Direct_communication_request, which contains a PC5-SP Message Type. At present, the values and corresponding meanings of PC5-SP Message Type are shown in table 2.

TABLE 2

| Message Type value | Corresponding meaning |
| --- | --- |
| 00000001 | DIRECT_COMMUNICATION_REQUEST |
| 00000010 | DIRECT_COMMUNICATION_ACCEPT |
| 00000011 | DIRECT_COMMUNICATION_REJECT |
| 00000100 | DIRECT_COMMUNICATION_KEEPALIVE |
| 00000101 | DIRECT_COMMUNICATION_KEEPALIVE_ACK |
| 00000111 | DIRECT_COMMUNICATION_RELEASE |
| 00001000 | DIRECT_COMMUNICATION_RELEASE_ACCEPT |
| 00001001 | TMGI_MONITORING_REQUEST |
| 00001011 | TMGI_MONITORING_RESPONSE |
| 00001111 | CELL_ID_ANNOUNCEMENT_REQUEST |
| 00010000 | CELL_ID_ANNOUNCEMENT_RESPONSE |
| 00010001 | DIRECT_SECURITY_MODE_COMMAND |
| 00010011 | DIRECT_SECURITY_MODE_COMPLETE |
| 00010111 | DIRECT_SECURITY_MODE_REJECT |
| 00011111 | DIRECT_REKEYING_REQUEST |
| 00100000 | DIRECT_REKEYING_RESPONSE |
| 00010001 | DIRECT_REKEYING_TRIGGER |
| 00010011 | REMOTE_UE_INFO_REQUEST |

TABLE 2-continued

| Message Type value | Corresponding meaning |
| --- | --- |
| 00010111 | REMOTE_UE_INFO_RESPONSE |
| 00011111 | Reserved |
| 00100000 | Reserved |
| . | . |
| . | . |
| . | . |
| 11111111 | Reserved |

For example, the Remote UE may use the reserved values in the current PC5-SP Message Type (such as 000111111-11111111 in Table 2) to indicate the connection type of the network connection that the Remote UE needs to establish. For example, if the PC5-SP Message Type is 0001111, it indicates that the connection type of the network connection that the Remote UE needs to establish is the SRB; and if the PC5-SP Message Type is 00100000, it indicates that the connection type of the network connection that the Remote UE needs to establish is the SRB and DRB.

In an example, the PC5 signaling includes second indication information for indicating the connection type of the network connection that the Remote UE needs to establish.

Specifically, information (i.e., second indication information) of 1 bit may be configured (or added) in the PC5 signaling, and the information of 1 bit is used for indicating a connection type of a network connection that the Remote UE needs to establish. For example, when a value of the second indication information is "1", it indicates that the connection type of the network connection that the Remote UE needs to establish is the SRB. For example, when the value of the second indication information is "0", it indicates that the connection type of the network connection that the Remote UE needs to establish is the SRB and DRB.

Alternatively, Spare in the PC5 signaling may be used for indicating a connection type of a network connection that the Remote UE needs to establish. New information (i.e., second indication information) is defined by occupying 1 bit in the Spare, and the newly defined information is used for indicating the connection type of the network connection that the Remote UE needs to establish. For example, if the connection type of the network connection that the Remote UE needs to establish is the SRB, a value of the newly defined information bit in the PC5 signaling sent by the Remote UE is "1"; and if the connection type of the network connection that the Remote UE needs to establish is the SRB and DRB, the value of the newly defined information bit in the PC5 signaling sent by the Remote UE is "0".

In S202, the Relay UE receives the second message, and the Relay UE determines whether a network connection needs to be established or modified.

Specifically, after receiving the second message, the Relay UE determines whether a network connection needs to be established according to the second message. When the connection type of the network connection that the Remote UE needs to establish is not established by the Relay UE, the Relay UE determines that the network connection needs to be established. When the connection type of the network connection that the Remote UE needs to establish is established by the Relay UE, the Relay UE determines that the network connection does not need to be established. For example, the Relay UE currently only has SRB, but the Remote UE has connection demands for SRB and DRB, in this case, the Relay UE needs to establish an additional connection.

In addition, if a network connection initially established by the Relay UE does not take existence of the Remote UE into account, the established network connection does not have relay forwarding capability. After the Relay UE receives the second message, if the connection type of the network connection that the Remote UE needs to establish has been established by the Relay UE, the Relay UE needs to determine whether the network connection previously established by it has the relay forwarding capability. If the Relay UE determines that the network connection previously established by it does not have relay forwarding capability, the Relay UE needs to modify the network connection; otherwise, the Relay UE does not need to modify the network connection.

In S203, when the Relay UE determines that a network connection needs to be established or modified, the Relay UE sends a first message to a network device; wherein the first message is used for applying for establishing or modifying the network connection, and the first message is further used for indicating that a device served by the network connection applied for by the Relay UE is at least one user equipment except the Relay UE.

In an example, the connection type of the network connection that the first message is used for applying for establishing includes the connection type of the network connection that the second user equipment needs to establish.

Specifically, assuming that the Relay UE is currently in an idle state, the Remote UE has only an SRB connection demand, the connection type of the network connection applied for and established by the Relay UE through the first message is only SRB, or the connection type of the network connection applied for and established by the Relay UE through the first message is the SRB and DRB.

In an example, when the connection type of the network connection that the first message is used for applying for establishing or modifying is the SRB, the first message is a Radio Resource Control (RRC) message, the RRC message includes a tag, and the tag is used for indicating that the device served by the network connection applied for by the Relay UE is at least one user equipment except the Relay UE.

Specifically, in order to enable the network device to distinguish a purpose for which the Relay UE currently applies for establishing or modifying the SRB, the Relay UE may configure a tag in the RRC message to indicate that a device served by the SRB that is currently applied for by the Relay UE is for the Remote UE. After the network device receives the RRC message, if the RRC message includes the tag, the network device may know that the SRB currently applied for by the Relay UE is for the Remote UE, and if the RRC message does not include the tag, the network device may know that the SRB currently applied for by the Relay UE is for itself.

Further, when the RRC message is an RRC connection request message, the tag is a newly added value of an establishment Cause field in the RRC connection request message, or the tag is a fixed value of the establishment Cause field in the RRC connection request message.

Specifically, a tag in an RRC Connection Request message is used, for example, a value of the establishment Cause filed is added to indicate that the SRB that the Relay UE currently applies for establishing is for the Remote UE; or a fixed value of the establishment Cause field is used to indicate that the SRB that the Relay UE currently applies for establishing is for the Remote UE.

Further, when the RRC message is an RRC connection setup complete message, the tag is indication information carried in the RRC connection setup complete message.

Specifically, a tag in an RRC Connection Setup Complete message is used, for example, indication information carried in the RRC Connection Setup Complete message is used to indicate that the SRB that the Relay UE currently applies for establishing is for the Remote UE.

In an example, when the RRC message is a sidelink UE Information message, the tag is second indication information carried in the sidelink UE Information message.

Specifically, after the connection establishment is completed, if the Relay UE wants to modify the network connection, a tag in the sidelink UE Information message is used. For example, indication information carried in the sidelink UE Information message is used to indicate that the SRB that the Relay UE currently applies for modifying is for the Remote UE.

In an example, the first message is an enhanced Non-access Stratum (NAS) message when the connection type of the network connection that the first message is used for applying for establishing is the SRB and DRB.

Specifically, the Relay UE sends an enhanced NAS message to the network device. For example, the Relay UE sends an enhanced service request message to the network device, but the enhanced service request message is different from a traditional service request message. After the network device receives the enhanced service request message, the network device may know that the network connection (namely SRB and DRB) currently applied for by the Relay UE is for other devices.

In addition, compared with the traditional service request message, the enhanced service request message may newly add information of 1 bit on the basis of the traditional service request message, and the newly added information of 1 bit is used for indicating that the network connection currently applied for by the Relay UE is for the Remote UE. Or, compared with the traditional service request message, the enhanced service request message may configure a spare bit in the traditional service request message to be a preset value to indicate that the network connection currently applied for by the Relay UE is for the Remote UE, or the like. The present application does not make a restriction on the enhanced service request message.

In an example, the first message is an enhanced RRC message when the connection type of the network connection that the first message is used for applying for establishing is the SRB and DRB.

Specifically, the Relay UE sends an enhanced RRC message to the network device, for example, the Relay UE sends an enhanced RRC Connection Request to the network device, or sends an enhanced RRC message (such as an enhanced RRC Connection Setup Complete message, or an enhanced RRC Connection Request message), and the enhanced RRC message is different from a traditional RRC message. After the network device receives the enhanced RRC message, the network device may know that the network connection (i.e., SRB and DRB) currently applied for by the Relay UE is for other devices.

Further, the enhanced RRC message includes a third tag for indicating that the device served by the network connection applied for by the first user equipment is at least one user equipment except the first user equipment.

Specifically, in order to enable the network device to distinguish a purpose for which the Relay UE currently applies for establishing the SRB and DRB, the enhanced RRC message includes a third flag for indicating that the device served by the SRB and DRB currently applied for by the Relay UE is for the Remote UE. After the network device receives the enhanced RRC message, if the RRC message includes the third tag, the network device may know that the SRB and DRB currently applied for by the Relay UE are for the Remote UE, and if the RRC message does not include the third tag, the network device may know that the SRB and DRB currently applied for by the Relay UE are for itself.

Further, when the enhanced RRC message is an RRC connection request message, the third tag is a newly added value of an establishment Cause field in the RRC connection request message, or the third tag is a fixed value of the establishment Cause field in the RRC connection request message.

Specifically, a tag in an RRC Connection Request message is used, for example, a value of the establishment Cause field is added to indicate that the SRB and DRB that the Relay UE currently applies for establishing are for the Remote UE; or a fixed value of the establishment Cause field is used to indicate that the SRB and DRB that the Relay UE currently applies for establishing are for the Remote UE.

Further, when the enhanced RRC message is an RRC connection setup complete message, the third tag is indication information carried in the RRC connection setup complete message.

Specifically, a tag in an RRC Connection Setup Complete message is used, for example, indication information carried in the RRC Connection Setup Complete message is used to indicate that the SRB and DRB that the Relay UE currently applies for establishing are for the Remote UE.

In S204, the network device receives the first message, and the network device determines whether to accept the application for the network connection from the first user equipment according to the first message.

Specifically, for an application for establishing an SRB, a base station decides to accept or reject the application for establishing the SRB according to the RRC message; and for an application for establishing a DRB, an MME decides to accept or reject the application for establishing the DRB according to the NAS message. If the network device bears a relatively large number of devices, and the network connection applied for by Relay UE is for the Remote UE, in this case, the network device may reject the application from the Relay UE. Further, if the network device has enough bearing space, and the network connection applied for by the Relay UE is for the Remote UE, in this case, the network device may accept the application from the Relay UE.

In the solution, when the first user equipment determines that a network connection needs to be established or modified, the first user equipment applies to the network device for establishing or modifying the network connection through a message. In addition, the message is used for informing the network device that the network connection applied for by the first user equipment is for serving other device(s). It can be seen that the first user equipment may establish or modify the network connection for the Remote UE in the above-described way.

Figure 4:
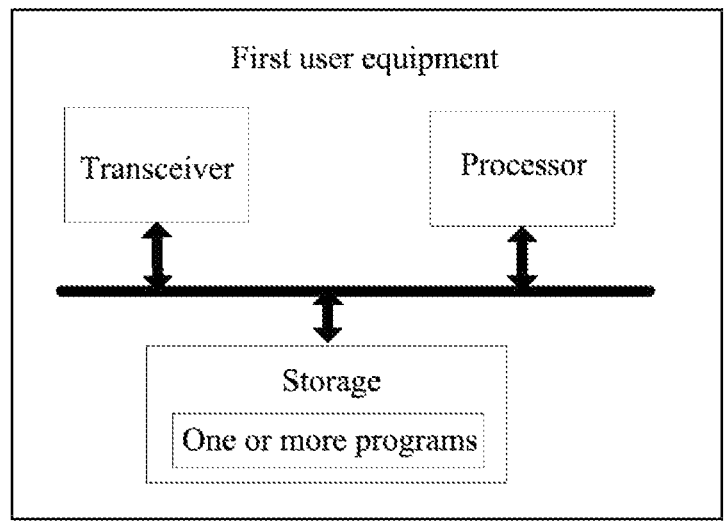
FIG. 4 is a schematic diagram of structure of a user equipment provided by an implementation of the present application.

Consistent with the above implementation shown in FIG. 2, referring to FIG. 4, FIG. 4 is a schematic diagram of structure of a user equipment provided by an implementation of the present application. The user equipment is applied to a communication system which includes a first user equipment, a network device and a second user equipment. The user equipment shown in FIG. 4 is a first user equipment. As shown in the figure, the user equipment includes one or more processors, one or more storages, one or more transceivers and one or more programs. Herein, the one or more programs are stored in the one or more storages and configured to be executed by the one or more processors. The one or more programs include instructions for performing following acts: a first user equipment sends a first message to a network device when determining that a network connection needs to be established or modified, wherein the first message is used for applying for establishing or modifying the network connection. A connection type of the network connection includes a Signaling Radio Bearer (SRB) and/or a Data Radio Bearer (DRB), and the first message is further used for indicating that a device served by the network connection applied for by the first user equipment is at least one user equipment except the first user equipment.

In an example, the first message is further used for the network device to determine whether to accept the network connection applied for by the first user equipment.

In an example, before the first user equipment determines that the network connection needs to be established or modified, one or more programs further include instructions for performing the following acts: the first UE receives a second message sent by a second user equipment, wherein the second message is used for indicating the connection type of the network connection that the second user equipment needs to establish.

In an example, when the connection type of the network connection that the second user equipment needs to establish is not established by the first user equipment, the first user equipment determines that the network connection needs to be established, wherein the connection type of the network connection that the first message is used for applying for establishing includes the connection type of the network connection that the second user equipment needs to establish.

In an example, the second message is a PC5 signaling, and a message type of the PC5 signaling is used for indicating a connection type of a network connection that the Remote UE needs to establish.

In an example, the second message is a discovery message of device-to-device, the discovery message includes a message type, and a content type of the message type is used for indicating the connection type of the network connection that the Remote UE needs to establish.

In an example, when the connection type of the network connection that the first message is used for applying for establishing or modifying is the SRB, the first message is an RRC message, and the RRC message includes a tag for indicating that a device served by the network connection applied for by the first user equipment is at least one user equipment except the first user equipment.

In an example, when the RRC message is an RRC connection request message, the tag is a newly added value of an establishment Cause field in the RRC connection request message, or the tag is a fixed value of the establishment Cause filed in the RRC connection request message.

In an example, when the RRC message is an RRC connection setup complete message, the tag is first indication information carried in the RRC connection setup complete message.

In an example, when the RRC message is a sidelink UE Information message, the tag is second indication information carried in the sidelink UE Information message.

In an example, the first message is an enhanced NAS message when the connection type of the network connection that the first message is used for applying for establishing is the SRB and DRB.

In an example, the first message is an enhanced RRC message when the connection type of the network connection that the first message is used for applying for establishing is the SRB and DRB.

In the solution, when the first user equipment determines that a network connection needs to be established or modified, the first user equipment applies to the network device for establishing or modifying the network connection through a message. In addition, the message is used for informing the network device that the network connection applied for by the first user equipment is for serving other device(s). It can be seen that the first user equipment may establish or modify the network connection for the Remote UE in the above-described way.

Figure 5:
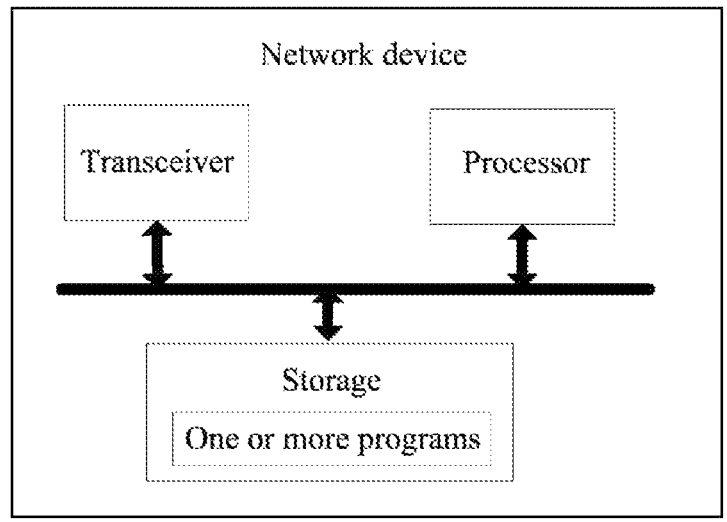
FIG. 5 is a schematic diagram of structure of a network device provided by an implementation of the present application.

Consistent with the implementation shown in FIG. 2, referring to FIG. 5, FIG. 5 is a schematic diagram of structure of a network device provided by an implementation of the present application. As shown in the figure, the network device includes one or more processors, one or more storages, one or more transceivers and one or more programs. Herein, the one or more programs are stored in the one or more storages and configured to be executed by the one or more processors. The one or more programs include instructions for performing following acts: receiving a first message sent by a first user equipment when the first user equipment determines that a network connection needs to be established or modified, wherein, the first message is used for applying for establishing or modifying the network connection, a connection type of the network connection includes a Signaling Radio Bearer (SRB) and/or a Data Radio Bearer (DRB), and the first message is further used for indicating that a device served by the network connection applied for by the first user equipment is at least one user equipment except the first user equipment; and determining whether to accept the network connection applied for by the first user equipment according to the first message.

In an example, when the connection type of the network connection that the first message is used for applying for establishing is the SRB, the first message is an RRC message, and the RRC message includes a tag for indicating that the device served by the network connection applied for by the first user equipment is at least one user equipment except the first user equipment.

In an example, when the RRC message is an RRC connection request message, the tag is a newly added value of an establishment Cause field in the RRC connection request message, or the tag is a fixed value of the establishment Cause filed in the RRC connection request message.

In an example, when the RRC message is an RRC connection setup complete message, the tag is indication information carried in the RRC connection setup complete message.

In an example, when the RRC message is a sidelink UE Information message, the tag is second indication information carried in the sidelink UE Information message.

In an example, the first message is an enhanced Non-access Stratum (NAS) message when the connection type of the network connection that the first message is used for applying for establishing is the SRB and DRB.

In an example, the first message is an enhanced RRC message when the connection type of the network connection that the first message is used for applying for establishing is the SRB and DRB.

In the solution, when the first user equipment determines that a network connection needs to be established or modified, the first user equipment applies to the network device for establishing or modifying the network connection through a message. In addition, the message is used for informing the network device that the network connection applied for by the first user equipment is for serving other device(s). It can be seen that the first user equipment may establish or modify the network connection for the Remote UE in the above-described way.

Figure 6:
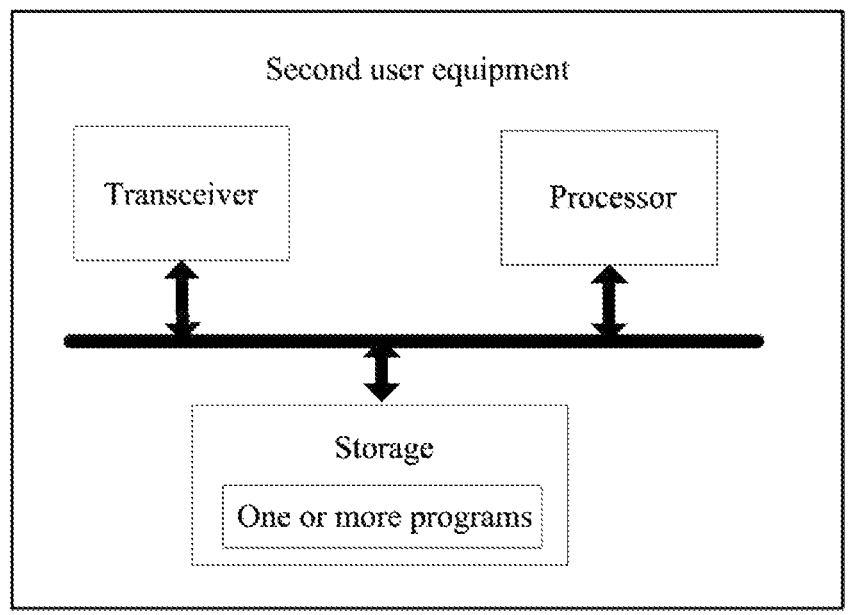
FIG. 6 is a schematic diagram of structure of another user equipment provided by an implementation of the present application.

Consistent with the above implementation shown in FIG. 2, referring to FIG. 6, which is a schematic diagram of structure of a user equipment provided by an implementation of the present application. The user equipment is applied to a communication system which includes a first user equipment, a network device and a second user equipment. The user equipment shown in FIG. 6 is a second user equipment. As shown in the figure, the user equipment includes one or more processors, one or more storages, one or more transceivers and one or more programs. Herein, the one or more programs are stored in the one or more storages and configured to be executed by the one or more processors. The one or more programs include instructions for performing following acts: the second user sends a second message to the first user equipment, wherein, the second message is used for indicating a connection type of a network connection that the second user equipment needs to establish, and the second message is further used for the first user equipment to determine whether establishing or modifying a network connection is needed.

In an example, the second message is a PC5 signaling, and a message type of the PC5 signaling is used for indicating the connection type of the network connection that the Remote UE needs to establish.

In an example, the second message is a discovery message of device-to-device, the discovery message includes a message type, and a content type of the message type is used for indicating the connection type of the network connection that the Remote UE needs to establish.

In this solution, after receiving the second message sent by the second user equipment, the first user equipment may determine whether a network connection needs to be established or modified according to the second message. Therefore the first user equipment establishes or modifies the network connection for the second user equipment.

The foregoing describes the solution provided in the implementation of the present application mainly from a perspective of interaction between network elements. It can be understood that the first user equipment, the second user equipment and the network device include corresponding hardware structures and/or software modules for performing the functions, so as to implement the foregoing functions. A person skilled in the art should easily understand that, in combination with units and algorithm acts in examples described with reference to the implementations disclosed in the application, the present application may be implemented by hardware or a combination of hardware and computer software. Whether a function is performed by hardware or computer software driving hardware depends on a particular application and a design constraint condition of the technical solution. Skilled in the art may use different ways to realize the described functions for each particular application, but such realization should not be considered to be beyond the scope of the present application.

Division for functional units can be performed for the first user equipment, the second user equipment and the network device in the implementations of the present application according to the above method examples. For example, various functional units can be divided according to various functions, or two or more functions can be integrated into one processing unit. The aforementioned integrated unit may be implemented in a form of hardware, or may be implemented in a form of a software program module. It should be noted that, the division for the units in implementations of the present application is exemplary, and is merely a logical function division. There can be other divisions in an actual realization.

Figure 7:
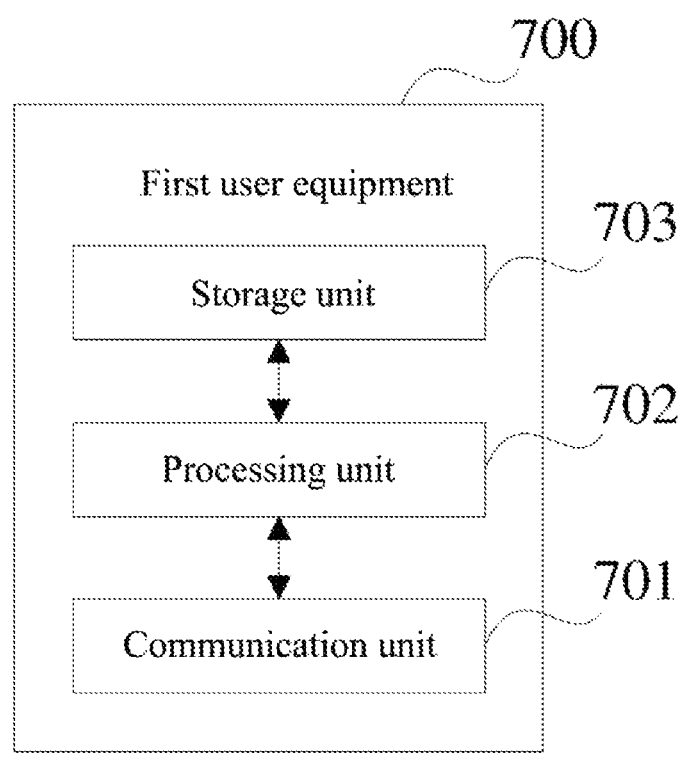
FIG. 7 is a schematic diagram of structure of another user equipment provided by an implementation of the present application.

In a case that an integrated unit or module is used, FIG. 7 illustrates a block diagram of possible composition of functional units of the first user equipment related to the above implementations. A first user equipment 700 includes a processing unit 702 and a communication unit 701. The processing unit 702 is used for controlling and managing acts of the first user equipment. For example, the processing unit 702 is used for supporting the first user equipment to execute the acts S202 and S203 in FIG. 2, and/or other processes for the techniques described in the application. The communication unit 701 is used for supporting communication between the first user equipment and other devices, such as communication with the network device shown in FIG. 5, and/or communication with the second user equipment shown in FIG. 6. The first user equipment may further include a storage unit 703 used for storing program codes and data of the first user equipment.

The processing unit 702 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware component, or any combination thereof. The processing unit may implement or execute various illustrative logical blocks, modules, and circuits described in connection with the disclosure of the present application. The processor may also be a combination for implementing computing functions, e.g., a combination including one or more microprocessors, a combination of a DSP and a microprocessor. The communication unit 701 may be a transceiver, a transceiving circuit, or a radio frequency chip, etc. The storage unit 703 may be a storage.

When the processing unit 702 is a processor, the communication unit 701 is a communication interface, and the storage unit 703 is a storage, the first user equipment related to the implementations of the present application may be the first user equipment shown in FIG. 4.

Figure 8:
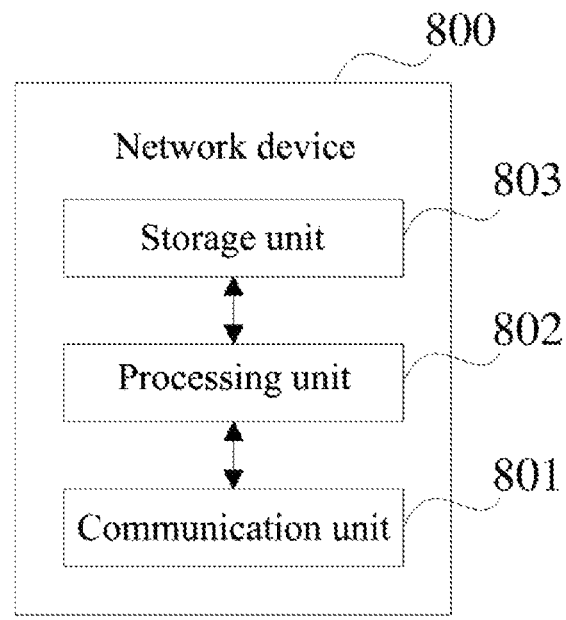
FIG. 8 is a schematic diagram of structure of another network device provided by an implementation of the present application.

In a case that an integrated unit is used, FIG. 8 illustrates a block diagram of possible composition of functional units of the network device related to the above implementations. A network device 800 includes a processing unit 802 and a communication unit 801. The processing unit 802 is used for controlling and managing acts of the network device. For example, the processing unit 802 is used for supporting the network device to execute act S204 in FIG. 2, and/or other processes for the techniques described in the application. The communication unit 801 is used for supporting communication between the network device and other devices, such as communication between the network device and the first user equipment as shown in FIG. 4. The network device further includes a storage unit 703 used for storing program codes and data of the network device.

Herein, the processing unit 802 may be a processor or a controller, for example, may be a CPU, a DSP, an ASIC, a FPGA or other programmable logic devices, a transistor logic device, a hardware component or any combination thereof. The processing unit may implement or execute various illustrative logical blocks, modules, and circuits described in connection with the disclosure of the present application. The processor may also be a combination for implementing computing functions, e.g., a combination including one or more microprocessors, a combination of a DSP and a microprocessor. The communication unit 801 may be a transceiver, or a transceiving circuit, and so on. The storage unit 803 may be a storage.

When the processing unit 802 is a processor, the communication unit 801 is a communication interface, and the storage unit 803 is a storage, the network device related to an implementation of the present application may be the network device shown in FIG. 5.

Figure 9:
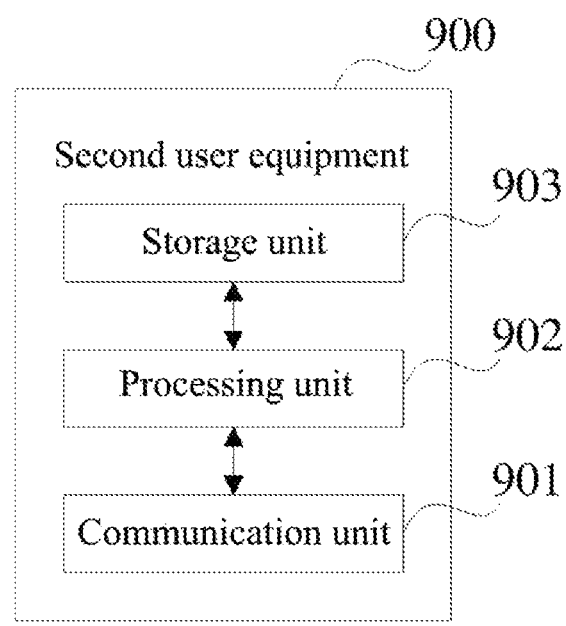
FIG. 9 is a schematic diagram of structure of another user equipment provided by an implementation of the present application.

In a case that an integrated unit is used, FIG. 9 illustrates a block diagram of possible composition of functional units of the second user equipment related to the above implementations. A second user equipment 900 includes a processing unit 902 and a communication unit 901. The processing unit 902 is used for controlling and managing acts of the second user equipment. For example, the processing unit 902 is used for supporting the second user equipment to execute the acts S201 in FIG. 2, and/or other processes for the techniques described in this document. The communication unit 901 is used for supporting communication between the second user equipment and other devices, such as communication between the network device and the first user equipment as shown in FIG. 4. The second user equipment further includes a storage unit 903 used for storing program codes and data of the second user equipment.

Herein, the processing unit 902 may be a processor or a controller, for example, may be a CPU, a DSP, an ASIC, a FPGA or other programmable logic devices, a transistor logic device, a hardware component or any combination thereof. The processing unit may implement or execute various illustrative logical blocks, modules, and circuits described in connection with the disclosure of the present application. The processor may also be a combination for implementing computing functions, e.g., a combination including one or more microprocessors, a combination of a DSP and a microprocessor. The communication unit 901 may be a transceiver, or a transceiving circuit, and so on. The storage unit 903 may be a storage.

When the processing unit 902 is a processor, the communication unit 901 is a communication interface, and the storage unit 903 is a storage, the second user equipment related to the implementation of the present application may be the second user equipment shown in FIG. 6.

Figure 10:
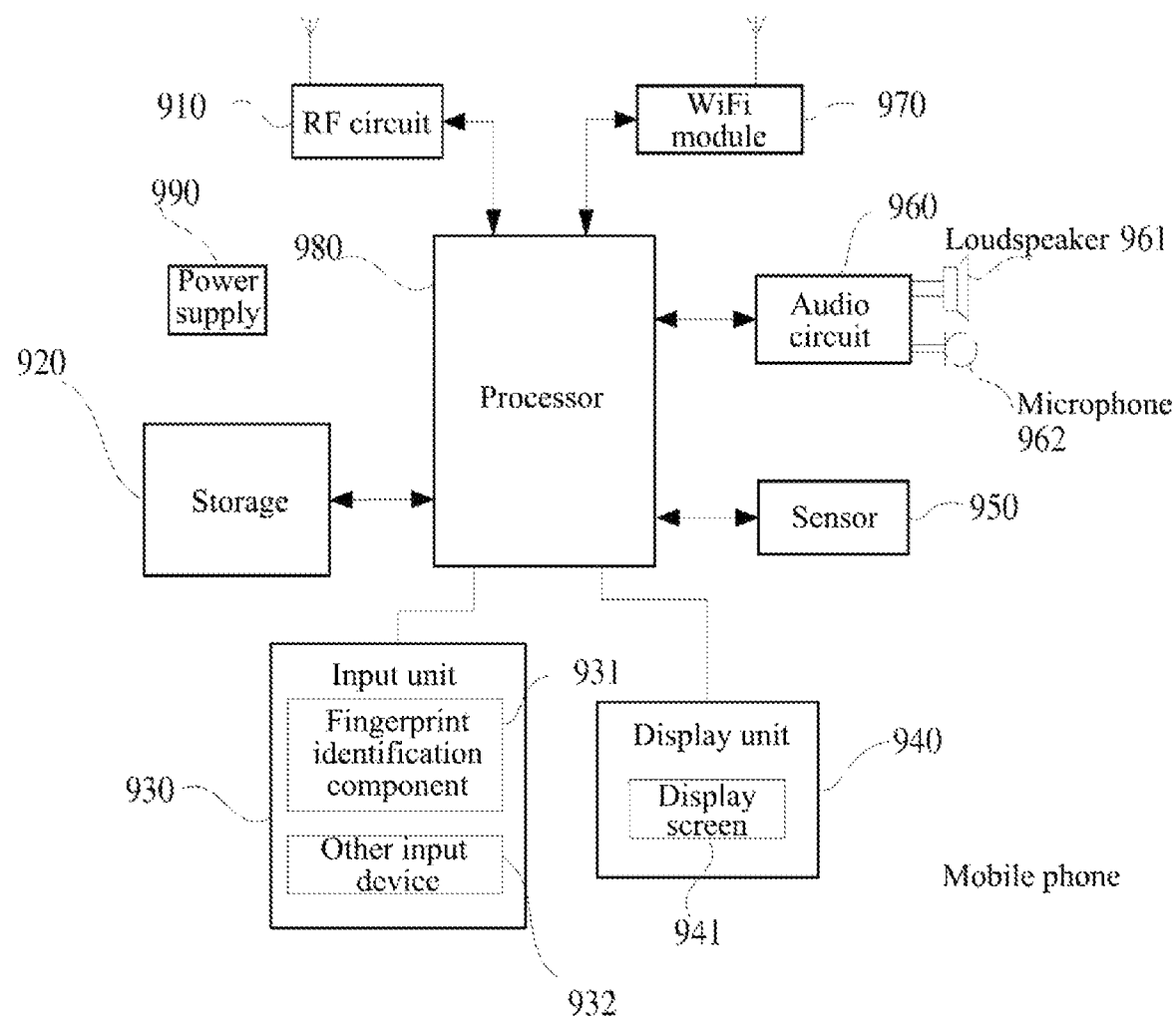
FIG. 10 is a schematic diagram of structure of another user equipment provided by an implementation of the present application.

Another user equipment is further provided in an implementation of the present application. As illustrated in FIG. 10, for ease of illustration, only parts related to implementations of the present application are shown, and the specific technical details which are not illustrated may refer to the part of a method according to an implementation of the present application. The user equipment may be a mobile phone, a tablet computer, a Personal Digital Assistant (PDA), a Point of Sales (POS), a vehicle-mounted computer, or any other user equipment. A mobile phone is taken as an example of the user equipment in the following.

FIG. 10 is a block diagram of a partial structure of a mobile phone related to a user equipment provided by an implementation of the present application. Referring to FIG. 10, the mobile phone includes parts such as a radio frequency (RF) circuit 910, a storage 920, an input unit 930, a display unit 940, a sensor 950, an audio circuit 960, a wireless fidelity (WiFi) module 970, a processor 980, and a power supply 990. A person skilled in the art may understand that the structure of the mobile phone shown in FIG. 10 does not constitute a limitation to the mobile phone, and the mobile phone may include more parts or fewer parts than those shown in the figure, or some parts may be combined, or a different part arrangement may be used.

In the following, each composition part of the mobile phone is specifically described with reference to FIG. 10.

The RF circuit 910 may be used to receive and send information. Generally, the RF circuit 910 includes, but is not limited to, an antenna, at least one amplifier, a transceiver, a coupler, a Low Noise Amplifier (LNA), a duplexer, and the like. In addition, the RF circuit 910 may further communicate with a network and another device via wireless communication. The wireless communication may use any communication standard or protocol, which includes, but is not limited to, a Global System for Mobile Communication (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The storage 920 may be used for storing software programs and modules, and the processor 980 runs the software programs and modules stored in the storage 920 to execute various functional applications and data processing of the mobile phone. The storage 920 may mainly include a program storage area and a data storage area, wherein the program storage area may store an operating system, a computer program required for at least one function, and the like. The data storage area may store data or the like created according to the use of the mobile phone. In addition, the storage 920 may include a high speed random access storage, and may also include a non-volatile storage, such as at least one magnetic disk storage device, a flash storage, or other volatile solid-state storage device.

The input unit 930 may be configured to receive input digital or character information, and generate key signal inputs related to user settings and function control of the mobile terminal 600. Specifically, the input unit 930 may include a fingerprint identification component 931 and other input device 932. The fingerprint identification component 931 may collect fingerprint data inputted by the user thereon. Besides the fingerprint identification component 931, the input unit 930 may further include other input device 932. Specifically, the other input devices 932 may include, but is not limited to, one or more of a touch control screen, a physical keyboard, a function key (for example, a volume control key, or a switch key), a track ball, a mouse, a joystick, and so on.

The display unit 940 may be used for displaying information input by the user or information provided for the user, and various menus of the mobile phone. The display unit 940 may include a display screen 941. Optionally, the display screen 941 may be configured by a Liquid Crystal Display (LCD), an Organic Light-Emitting Diode (OLED), or the like. Although the fingerprint identification component 931 and the display screen 941 in FIG. 10 are used as two separate parts to realize the input and input function of the mobile phone, in some implementations, the fingerprint identification component 931 and the display screen 941 may be integrated to realize the input function and playing function of the mobile phone.

The mobile phone may further include at least one sensor 950, such as an optical sensor, a motion sensor or other sensor. Specifically, the optical sensor may include an ambient light sensor and a proximity sensor, where the ambient light sensor may adjust the luminance of the display screen 941 according to brightness of the ambient light, and the proximity sensor may turn off the display screen 941 and/or backlight when the mobile phone is moved to the ear. As one type of the motion sensor, an acceleration sensor may detect the magnitudes of accelerations in various directions (generally triaxial), may detect the magnitude and direction of the gravity when the sensor is still, may be used in an application for identifying a gesture of a mobile phone (for example, switching between landscape and portrait, related games, and gesture calibration of a magnetometer), and a function related to vibration identification (such as a pedometer and a tap). Other sensors, for example, a gyroscope, a barometer, a hygrometer, a thermometer, and an infrared sensor, which may be configured in the mobile phone are not further described herein.

An audio circuit 960, a loudspeaker 961, and a microphone 962 may provide audio interfaces between the user and the mobile phone. The audio circuit 960 may transmit electrical signals converted from the received audio data to the loudspeaker 961, and the loudspeaker 961 may convert the electrical signals into sound signals for playing. On the other hand, the microphone 962 converts collected sound signals into electrical signals, which are received by the audio circuit 960 and then converted into audio data. After the audio data is processed by the processor 980, the audio data is sent to another mobile phone via the RF circuit 910, or the audio data is stored to the storage 920 for further processing.

WiFi is a short-range wireless transmission technology. The mobile phone may help users to send and receive E-mails, browse web pages and access streaming media and the like through WiFi module 970. The WiFi module 970 provides users with wireless broadband Internet access. Although FIG. 10 shows the WiFi module 970, it may be understood that, the WiFi module 670 is not an essential part of the mobile phone, and can be completely omitted as required without changing the essence of the present application.

The processor 980 is a control center of the mobile phone, and connects various parts of a whole mobile phone by using various interfaces and circuits. By running or executing software programs and/or modules stored in the storage 920 and invoking data stored in the storage 920, the processor 680 performs various functions of the mobile phone and processes data, thereby performing overall monitoring on the mobile phone. Optionally, the processor 980 may include one or multiple processing units. Preferably, the processor 980 may integrate an application processor and a modulation and demodulation processor, where the application processor mainly processes the operating system, user interface, application program, and so on, and the modulation and demodulation processor mainly processes wireless communication. It may be understood that, the foregoing modem processor may be not integrated into the processor 980.

The mobile phone further includes the power supply 990 (such as a battery) for supplying power to each part. Preferably, the power supply may be logically connected to the processor 980 by using a power management system, thereby implementing functions such as charging, discharging, and power consumption management by using the power management system.

Although not shown in the figure, the mobile phone may further include a camera, a Bluetooth module, and the like, which are not further described herein.

In the foregoing implementation shown in FIG. 2, the flow at the user equipment side in each act method can be implemented based on the structure of the mobile phone.

In the foregoing implementations shown in FIG. 7 and FIG. 9, the function of each unit can be implemented based on the structure of the mobile phone.

An implementation of the present application provides a computer readable storage medium. The computer readable storage medium stores a computer program for electronic data interchange, and the computer program causes a computer to execute parts or all of the acts described for the first user equipment in the above method implementations.

An implementation of the present application also provides a computer readable storage medium. The computer readable storage medium stores a computer program for electronic data interchange, and the computer program causes a computer to execute parts or all of the acts described for the network device in the above method implementations.

An implementation of the present application provides a computer readable storage medium. The computer readable storage medium stores a computer program for electronic data interchange, and the computer program causes a computer to execute parts or all of the acts described for the second user equipment in the above method implementations.

An implementation of the present application also provides a computer program product. The computer program product includes a non-transitory computer readable storage medium storing a computer program, and the computer program is operable to cause a computer to execute parts or all of the acts described for the first user equipment in the above method. The computer program product may be a software installation package.

An implementation of the present application also provides a computer program product. The computer program product includes a non-transitory computer readable storage medium storing a computer program, and the computer program is operable to cause a computer to execute parts or all of the acts described for the network device in the above method implementations. The computer program product may be a software installation package.

An implementation of the present application also provides a computer program product. The computer program product includes a non-transitory computer readable storage medium storing a computer program, and the computer program is operable to cause a computer to execute parts or all of the acts described for the second user equipment in the above method. The computer program product may be a software installation package.

The acts of the method or algorithm described in implementations of the present application may be implemented in hardware, or implemented in a manner of executing software instructions by a processor. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An exemplary storage medium is coupled to the processor such that the processor can read information from a storage medium, and write information to the storage medium. The storage medium may be a component of the processor. The processor and the storage medium may be located in an ASIC. In addition, the ASIC may be located in an access network device, a target network device, or a core network device. The processor and the storage medium may also act as separate components in the access network device, the target network device, or the core network device.

Those skilled in the art should realize that in one or more examples described above, the functions described in the implementations of the present application may be implemented in whole or in parts through software, hardware, firmware, or any combination thereof. When the functions described in the implementations of the present application are implemented through software, these functions may be implemented in whole or in parts in the form of a computer program product. The computer program product includes one or more computer instructions. When the computer program instructions are loaded and executed on a computer, the processes or functions are generated in whole or in parts according to the implementations of the present application. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The specific implementations described above further explain the purpose, the technical solutions and the beneficial effects of the implementations of the present application in detail. It should be understood that the above is only the specific implementations of the implementations of the present application, and is not used to limit the protection scope of the implementations of the present application. Any modification, equivalent substitution, improvement, etc. made on the basis of the technical solution of the implementations of the present application shall be included in the protection scope of the implementations of the present application.

The invention claimed is:

1. A method for network connection configuration, comprising:

sending, by a first User Equipment (UE), a first message to a network device when the first user equipment determines that a network connection needs to be established or modified, wherein the first message is used for applying for establishing or modifying the network connection, a connection type of the network connection comprises a Data Radio Bearer (DRB) or the DRB and a Signaling Radio Bearer (SRB), and the first message is further used for indicating that a device served by the network connection applied for by the first user equipment is at least one user equipment except the first user equipment, wherein before the first user equipment determines that the network connection needs to be established or modified, the method further comprises:

receiving, by the first user equipment, a second message sent by a second user equipment, wherein the second message is used for indicating the connection type of the network connection that the second user equipment needs to establish.

2. The method according to claim 1, wherein the first message is further used for the network device to determine whether to accept the network connection applied for by the first user equipment.

3. The method according to claim 1, wherein, when the connection type of the network connection that the second user equipment needs to establish has not been established by the first user equipment, the first user equipment determines that the network connection needs to be established, wherein the connection type of the network connection that the first message is used for applying for establishing includes the connection type of the network connection that the second user equipment needs to establish.

4. The method according to claim 1, wherein the second message is a PC5 signaling, and a message type of the PC5 signaling is used for indicating the connection type of the network connection that the second user equipment needs to establish.

5. The method according to claim 1, wherein the second message is a discovery message of device-to-device, the discovery message includes a message type, and a content type of the message type is used for indicating the connection type of the network connection that the second user equipment needs to establish.

6. The method according to claim 1, wherein when the connection type of the network connection that the first message is used for applying for establishing or modifying is the SRB, the first message is a Radio Resource Control (RRC) message, and the RRC message includes a tag for indicating that a device served by the network connection applied for by the first user equipment is at least one user equipment except the first user equipment.

7. The method according to claim 6, wherein when the RRC message is an RRC connection request message, the tag is a newly added value of an establishment Cause field in the RRC connection request message, or the tag is a fixed value of the establishment Cause field in the RRC connection request message.

8. The method according to claim 6, wherein when the RRC message is an RRC connection setup complete message, the tag is first indication information carried in the RRC connection setup complete message.

9. The method according to claim 6, wherein when the RRC message is a sidelink UE Information message, the tag is second indication information carried in the sidelink UE Information message.

10. The method according to claim 1, wherein the first message is an enhanced Non-access Stratum (NAS) message when the connection type of the network connection that the first message is used for applying for establishing is the SRB and the DRB.

11. The method according to claim 1, wherein the first message is an enhanced Radio Resource Control (RRC) message when the connection type of the network connection that the first message is used for applying for establishing is the SRB and the DRB.

12. A method for network connection configuration, comprising:
sending, by a second User Equipment (UE), a second message to a first user equipment;
wherein the second message is used for indicating a connection type of a network connection that the second user equipment needs to establish, and the second message is further used for the first user equipment to determine whether establishing or modifying a network connection is needed; and
wherein the connection type of the network connection includes a Data Radio Bearer (DRB) or the DRB and a Signaling Radio Bearer (SRB).

13. The method according to claim 12, wherein the second message is a PC5 signaling, and a message type of the PC5 signaling is used for indicating the connection type of the network connection that the second user equipment needs to establish.

14. The method according to claim 12, wherein the second message is a discovery message of device-to-device, the discovery message includes a message type, and a content type of the message type is used for indicating the connection type of the network connection that the second user equipment needs to establish.

15. A user equipment comprising a processor and a transceiver;
wherein the processor is used for sending a first message to a network device through the transceiver when the user equipment determines that a network connection needs to be established or modified;
wherein the first message is used for applying for establishing or modifying the network connection, a connection type of the network connection comprises a Data Radio Bearer (DRB) or the DRB and a Signaling Radio Bearer (SRB), and the first message is further used for indicating that a device served by the network connection applied for by the user equipment is at least one user equipment except the user equipment; and
wherein before determining that the network connection needs to be established or modified, the processor is further used for:
receiving a second message sent by a second user equipment, wherein the second message is used for indicating the connection type of the network connection that the second user equipment needs to establish.

16. The user equipment according to claim 15, wherein the first message is further used for the network device to determine whether to accept the network connection applied for by the user equipment.

17. The user equipment according to claim 15, wherein the processor is used for determining that the network connection needs to be established when the connection type of the network connection that the second user equipment needs to establish has not been established by the user equipment, wherein the connection type of the network connection that the first message is used for applying for establishing includes the connection type of the network connection that the second user equipment needs to establish.

18. The user equipment according to claim 15, wherein the second message is a PC5 signaling, and a message type of the PC5 signaling is used for indicating the connection type of the network connection that the second user equipment needs to establish.

* * * * *